Patented Oct. 1, 1940

2,216,295

UNITED STATES PATENT OFFICE

2,216,295

METHOD OF STERILIZING FRUIT JUICES

Gotthold Harry Meinzer, Glendale, Calif., assignor to California Consumers Corporation, Los Angeles, Calif., a corporation of California No Drawing. Application August 15, 1938, Serial No. 225,048

3 Claims. (Cl. 99—155)

An object of the invention is to destroy bacteria and other micro-organisms present in fruit juices without the application of heat thereto.

A corollary object of the invention is to reduce the temperature or the amount of heating required to inactivate the enzymes present in fruit juices.

Juices as they exist in the fruit are sterile, but in the manipulations by which they are removed from the fruit they inevitably become contaminated with various micro-organisms—bacteria and the spores of yeasts and molds. The latter organisms tend to produce fermentation and the bacteria are highly undesirable in a potable liquid, there always being the chance that some of them may be pathogenic. The juices also contain certain enzymes which, after separation of the juice from the fruit and its exposure to air, promote oxidizing reactions, reduce the vitamin content, have an undesirable effect on the flavor of the juice and tend to produce stratification on standing.

The micro-organisms are destroyed and the enzymes are rendered inactive by heating, the first named effect requiring (in order to obtain a dependable result) a higher temperature or a longer heating period than the second. For example, B. subtillus, a pathogenic organism sometimes found in fruit juices after the period of manipulation, is destroyed at a temperature of 212° F. applied for not less than two minutes, while the enzymes present in most fruit juices are completely inactivated at the same temperature with thirty seconds application, or at a materially lower temperature with a correspondingly lengthened heating time. The so-called flash pasteurization step, in which the juice is heated to the boiling point for only perhaps two seconds, is usually far from sufficient to destroy all the micro-organisms.

The treatment which I propose has no direct effect on the enzymes when applied to the whole juice, but it completely and dependably sterilizes it without having recourse to any heating whatever. It has no effect on the color, flavor, or aroma of the juice to which it is applied and thus leaves the juice with its freshness and palatability entirely unimpaired. Further, the prior application of this cold sterilizing step to the juice permits the use of a lower temperature or a shorter heating time, or both for the inactivation of the enzymes, by which the well known effect of heat in progressively depreciating the palatability of many fruit juices is correspondingly reduced.

The treatment which I have discovered consists in treating the juice, or a fraction separated from it, with chlorine in gaseous form or in the form of an alkali metal hypochlorite, as for example sodium hypochlorite, or in the form of any chlorine yielding compound which leaves an inert or innocuous residue.

In the case of a hypochlorite, such as that of sodium, the unstable salt is decomposed by the fruit acids with the liberation of chlorine. In the nascent state in which the chlorine thus evolved appears, it is more effective than is the same quantity of the gas. The reaction by which chlorine is liberated is somewhat obscure, but it has been determined that the end products are sodium citrate and sodium chloride. As the required dose of the hypochlorite rarely exceeds one hundred parts per million of juice treated and may be as low as twenty-five parts, and as both the residual salts are normal constituents of the citrus as well as other fruit juices in much larger quantity, the trifling addition of residual salts to the fruit juice thus occasioned has no effect whatever on its taste, palatability, or potability.

If prefererd, the chlorine may be added in the form of the free gas, with such agitation of the juice as will intimately contact every part of it with the gas, but the best and most rapid effect is produced by the nascent chlorine evolved from the hypochlorite or similar salt.

It is difficult to proportion exactly the dosage of chlorine to the requirement, and it is always to be apprehended that there may be an excess present after the agent has had its full effect. I therefore follow the treatment with chlorine with the step of strongly evacuating the liquid, preferably in thin flowing films, and thus completely withdrawing such gas as has not entered into combination and at the same time deaerating the liquid. In this manner the flavor and aroma of the juice are not depreciated by the final presence of even the slightest trace of free chlorine. I have found by repeated experiment that no free chlorine whatever remains in the juice after it has been evacuated in films at normal atmospheric temperature and at a pressure of about five inches of mercury absolute.

The method above described is applicable to whole fruit and vegetable juices and also to selected fractions of such juices. For example, it is known to separate tomato juice and the juices of the citrus fruits, by centrifugal force, into two fractions, one an aqueous liquid containing the fruit acids and sugars, the other a pulpy or pasty mass consisting to a large extent of solids or quasi-solids. Such processes are described, specifically for tomato juice in U. S. Patent No. 2,115,815 to David L. Johnson, in which the second named fraction is referred to as "meat solids," and specifically for the citrus fruit juices in my copending application Serial No. 225,047, filed of even date herewith, in which this fraction is referred to as the "chromatophore" fraction. These terms are substantially synonymous as indicating the heavier fraction, collecting in the bowl of the centrifuge, of any fruit or vegetable juice which is capable of centrifugal separation.

The patent and the copending application above identified disclose that the flavoring and aroma imparting constituents of these juices are wholly, and the coloring constituents substantially, concentrated in the chromatophore fraction. By reason of the absence of these constituents from the aqueous effluent from the centrifuge, this aqueous fraction may be heated for as long a time and as high a temperature as may be desired, without any change in its properties other than such as result from the removal of water. Consequently this fraction may be completely sterilized by heating without evaporation, or it may be concentrated by heating with evaporation of any desired proportion of water, without suffering any depreciation.

On the other hand, the chromatophore fraction, whatever its origin, is highly susceptible to heat, and particularly in the presence of acid liquids, and cannot even be pasteurized without material depreciation of flavor and aroma, while the application of a sterilizing temperature still further reduces its palatability.

The application of the instant cold sterilizing method to the separated chromatophore fraction is therefore highly advantageous, as it may be made the means of producing an absolutely sterile whole juice or concentrate without applying any heat whatever to the part of the juice which is adversely affected by heating.

For the preparation of a concentrate, the aqueous liquid is boiled down to the consistency of a syrup, usually (for the sake of economy) under reduced pressure but at a temperature sufficiently high to ensure sterilization. For the preparation of a sterile whole juice it suffices to heat the aqueous fraction to sterilization temperature without removal of any water. The chromatophore fraction being then sterilized in the cold by the method herein described, and the sterilized aqueous liquid or concentrate being cooled, the two are blended and yield a completely sterile product which (with or without replacement of removed water, as the case may be) exactly reproduce the original juice in color, flavor, and aroma.

While, as above said, the treatment with chlorine does not itself have any effect in inactivating the enzymes, the procedure just above outlined does substantially eliminate the detrimental effects of the enzymes on the juice, by reason of the following considerations.

The enzymes occur in the aqueous portion of the juice, not in the chromatophores themselves. It follows that in the chromatophore fraction, as produced by the centrifuge and which consists of chromatophores proper together with a variable proportion of entrained aqueous liquid, the quantity of enzymes will depend on the quantity of aqueous liquid entrained.

The volumetric relation of the chromatophore fraction to the original juice varies from one fruit to another but is always small. In the case of tomato juice this fraction may be as much as 10% to 12% by volume of the whole juice, while with the citrus fruits and the pineapple the chromatophore fraction will rarely have a volume exceeding 4% of that of the original juice. Of these percentage volumes no more than half and, with careful centrifuging, usually much less, will consist of aqueous liquid containing enzymes. It follows that from 94% to 98% of the original enzyme content of the juice passes to the separated aqueous liquid fraction while from 6% to 2% of the original content remains in the chromatophore fraction.

The enzymes occurring in the separated aqueous liquid are totally inactivated by the heating of this liquid to the sterilizing temperature. In this step no damage is done to the flavor or aroma of the final product because the bodies subject to such depreciation (the chromatophores) are absent from this fraction. The heating step unavoidably reduces the vitamin C content to some extent, by enzymatic reaction during the earlier stages of the heating, though this destruction of vitamins may be minimized by raising the temperature of the liquid fraction as rapidly as possible to that at which the enzymes are inactivated, the enzymatic reaction being relatively slow.

On recombination of the chlorine-sterilized chromatophore fraction with the heat-sterilized or concentrated liquid fraction, the small quantity of still active enzymes entrained by the chromatophores is rendered substantially inactive. In the case in which the liquid fraction is sterilized but not concentrated, this substantial inactivation is due to the extreme dilution of the active enzymes in the inactive liquid, it being well known that such dilution substantially inhibits enzymatic reactions. In the case in which the liquid fraction is concentrated to a syrup of small bulk, the reduction in activity of the remaining active enzymes is due to the large quantity of sugars in the blend of syrup and chromatophores and to the high viscosity of this blend.

In experimenting with various fruit juices and fractions thereof I have observed great differences in the susceptibility of various juices to the chlorine sterilization above described. Some juices, as for example lemon juice, were rendered completely sterile by treatment with twenty-five parts chlorine per million parts of juice, while other fruit and vegetable juices, as for example that of certain varieties of orange, required doses of chlorine as high as five hundred parts per million. While the treatment is inexpensive and no operating difficulties follow the use of larger doses, the use of such quantities of the reagent is objectionable in that the content of vitamin C is reduced by the treatment. With doses up to 100 parts per million the reduction in the vitamin content is immaterial, but where this dose is increased by five or more the loss of vitamin content becomes serious.

In these experiments I noted that the susceptibility to treatment of sour juices was much greater than that of juices low in acid, and after prolonged experiment I discovered that there is, at least in the case of the citrus juices, a critical point in hydrogen ion concentration (so-called pH value) above which the effectiveness of the chlorine treatment is much diminished—by "above" meaning greater in numerical pH value, i. e., of lower acid activity.

The results of the following experiments illustrate the effect of pH value on dosage and indicate that, at least in the case of orange juice, the critical pH value lies in the neighborhood of 2.91.

In these experiments the chromatophore fraction from the juice of navel and Valencia oranges was dosed with 20% solution of citric acid (pH 1.50) in quantities sufficient to produce a range of pH values, water being added when necessary to bring the mixture to sufficient fluidity. After careful blending, sodium hypochlorite solution was added in such doses as to give the desired quantity of available free chlorine, expressed below in parts per million parts of the chromatophore fraction taken. After again blending, each mixture was allowed to stand in a sterile atmosphere at 46° Fahr. for the time noted, after which it was deaerated and deprived of free chlorine in a sterile bell jar, sampled and plated out from a 1:10 dilution using wort and nutrient agars. The incubation was at 37.5° cent. for 48 hours.

| pH value | Chlorine dose | Contact time, minutes | Count after incubation | |
|---|---|---|---|---|
| | | | Yeast and mold | Bacteria |
| 3.85 | None | Control | More than 10,000 | |
| 3.85 | 500 | 15 | 106 | 200 |
| 3.85 | 500 | 60 | 6 | 47 |
| 3.85 | 500 | 180 | 27 | 177 |
| 3.85 | 250 | 30 | More than 10,000 | |
| 3.85 | 250 | 60 | c. 5000 | c. 6750 |
| 3.85 | 250 | 180 | 46 | 39 |
| 3.85 | 100 | 180 | More than 10,000 | |
| 3.53 | None | Control | Approx. | 7500 |
| 3.21 | 100 | 15 | 20 | 21 |
| 3.12 | 100 | 15 | 5 | 13 |
| 2.93 | 100 | 15 | 5 | 6 |
| 2.91 | 100 | 30 | Clean | Clean |
| 2.80 | 100 | 30 | Clean | Clean |
| 2.71 | 100 | 30 | Clean | Clean |

While these determinations were made on a fraction separated from orange juice, many similar determinations have been made on the whole juice of oranges, lemons, and other fruits, and on the chromatophore or meat solid fraction separated from tomato and other juices, with closely similar results.

The control of the pH value may be effected by the addition of solutions of citric or other fruit acids, or of syrups or juices containing relatively large quantities of such acids, such as lemon juice concentrate, the presence of additional sugars appearing to have no effect on the course of the sterilization.

When the pH value is controlled by the addition of acid to the whole juice, the dose may be impracticably large, from the standpoint both of cost and of increased sourness. This, of course, varies with the character of the original juice. Lemons, limes, and often grape-fruit yield juices which are usually sufficiently acid, or require only a trifling addition. On the other hand, sweet oranges and tomatoes yield juices low in acidity and requiring a large acid dose to bring the pH number down to the optimum. For example, a navel orange juice having a pH of 3.61 required a dose of 4.5% by weight of citric acid to bring the number down to 2.91 and was thereby rendered unpalatably sour.

On the other hand, when the pH correction is applied only to the chromatophore fraction, the quantity of acid required is such as has practically no effect on the taste of the juice when this fraction is recombined with the aqueous liquid from which it had been separated.

For example, a laboratory batch of 83 gallons of orange juice having the same pH value (3.61) and containing 10.1 mgms. anhydrous citric acid per ccm. was centrifuged with the separation of 80 gallons aqueous liquid and 3 gallons of chromatophore fraction.

To adjust the pH of this fraction to 2.91 required the addition of 518 grams citric acid, which after blending of the chromatophores with the (sterilized) aqueous liquid increased the acid content of the entire 83 gallons from 10.1 to 11.7 mgms. per ccm. This increase made no perceptible change in the taste of the juice and is well within the limits of variation of fresh ripe orange juice, of which eight samples picked at random showed citric acid contents ranging from 9.28 to 12.08 mgms. per ccm.

The sterilized product, either whole juice, recombined juice, or concentrate, should immediately be placed in sealed packages or containers from which air should be exhausted as completely as is feasible prior to sealing. In this manner renewed contamination of the product is avoided. It is also highly desirable to conduct all the steps above described (except, of course, the concentration and/or sterilization of the liquid fraction) at such temperatures as to minimize the enzymatic reaction, which is much accelerated by heating. In no case should the temperature of the whole juice or of the chromatophore fraction be allowed to go above 80° Fahr. at any stage of the treatment, and it is preferable to maintain a temperature of 60° Fahr. or below until the product is packaged. The liquid fraction may be handled without precautions as to temperature after its removal from the centrifuge.

In the selection of a hypochlorite for use in the production of chlorine in situ, any of the alkali-metal hypochlorites may be used. Sodium hypochlorite is the least costly of this group and appears to be fully as effective as the more expensive members of the group. The alkali-earth-metal hypochlorites are less suitable, as it is undesirable to introduce salts of these metals into a potable liquid.

In selecting an acid for use in controlling the pH value, any of the naturally occurring fruit acids is available. Generally speaking, it is desirable to use the particular acid which predominates in the juice or fraction being treated.

I claim as my invention:

1. The method of preparing a sterile fruit or vegetable juice which comprises: separating the juice into a fraction containing the major part of the chromatophores and an aqueous liquid fraction substantially free from chromatophores; sterilizing the aqueous fraction by heating the same to a temperature sufficient to destroy yeasts, molds, and bacteria contained therein; sterilizing the chromatophore fraction by the application thereto of free chlorine in the cold; removing any excess of free chlorine from the sterilized chromatophore fraction; cooling the sterilized aqueous fraction to substantially the temperature of the sterilized chromatophore fraction, and blending the sterilized fractions.

2. The method of preparing a sterile fruit or vegetable juice which comprises: separating the juice into a fraction containing the major part of the chromatophores and an aqueous liquid fraction substantially free from chromatophores;

sterilizing the aqueous fraction by heating the same; cooling the sterile aqueous fraction to a temperature not exceeding 80° Fahr.; sterilizing the chromatophore fraction by the application thereto at a temperature not exceeding 80° Fahr. of free chlorine; removing any excess of free chlorine from the sterile chromatophore fraction while avoiding any substantial rise in temperature, and blending the cooled sterile aqueous fraction with the cool sterile chromatophore fraction.

3. In a method of concentrating citrus fruit juices involving the separation of a chromatophore fraction from an aqueous liquid fraction, the heating of said liquid fraction to a temperature sufficient to destroy organisms therein and to evaporate water, and the admixture of the residue from said heating and evaporating step with the chromatophore fraction: the additional step of sterilizing said chromatophores by adding chlorine thereto and removing an excess of chlorine by strong evacuation of the treated chromatophores.

GOTTHOLD HARRY MEINZER.